United States Patent [19]

Yamamoto et al.

[11] Patent Number: 4,632,210

[45] Date of Patent: Dec. 30, 1986

[54] ENGINE EXHAUST SYSTEM AND SUPPORTING APPARATUS FOR TWO-WHEELED/THREE WHEELED VEHICLE

[75] Inventors: Hitoshi Yamamoto; Masayoshi Baba; Eiichi Iwao, all of Saitama, Japan

[73] Assignee: Honda Giken Kogyo Kabushiki Kaisha, Tokyo, Japan

[21] Appl. No.: 455,458

[22] Filed: Jan. 4, 1983

[30] Foreign Application Priority Data

Jan. 8, 1982 [JP] Japan .................... 57-1474

[51] Int. Cl.⁴ .............................. B62K 11/04
[52] U.S. Cl. ........................... 180/309; 180/89.2; 180/219; 180/296; 181/228
[58] Field of Search ........... 180/219, 229, 296, 309, 180/68.1, 227, 225, 68.2, 68.1; 181/227, 228, 204; D12/110

[56] References Cited

U.S. PATENT DOCUMENTS

| | | | |
|---|---|---|---|
| D. 262,446 | 12/1981 | Iwasaki | D12/110 |
| D. 269,171 | 5/1983 | Ikeda | D12/110 |
| D. 274,611 | 7/1984 | Nakano | D12/110 |
| 1,413,351 | 4/1922 | Peters | 180/225 |
| 1,510,937 | 10/1924 | Harley | 180/219 |
| 3,147,814 | 9/1964 | Suhre | 180/68.1 |
| 3,366,193 | 1/1968 | Campbell | 180/227 |
| 3,667,435 | 6/1972 | Bydgnes | 180/225 |
| 4,441,574 | 4/1984 | Kohyama | 180/219 |

FOREIGN PATENT DOCUMENTS 1200835 7/1959 France ................. 180/68.1

Primary Examiner—John J. Love
Assistant Examiner—Everett G. Diederiks
Attorney, Agent, or Firm—Sughrue, Mion, Zinn, Macpeak and Seas

[57] ABSTRACT

An exhaust system for a vehicle is made sufficiently long and yet allows the muffler to be located relatively close to the engine by curving the exhaust pipe about a cooling fan provided for the engine. The arrangement also facilitates mounting of the exhaust system to the engine and vehicle bodies at a fewer number of support points.

7 Claims, 6 Drawing Figures

ENGINE EXHAUST SYSTEM AND SUPPORTING APPARATUS FOR TWO-WHEELED/THREE WHEELED VEHICLE

BACKGROUND OF THE INVENTION

The present invention relates to an exhaust system supporting apparatus for a forcibly air-cooled engine of a two-wheeled/three-wheeled vehicle.

Generally, in an engine mounted on a two-wheeled/three-wheeled vehicle, if the length of an exhaust pipe connected to the exhaust port of the engine is set to a desired value, a relatively heavy exhaust muffler connected to the end of the exhaust pipe is separated from the engine body. Thus, in order to support the exhaust system including the exhaust pipe and the exhaust muffler at supporting portions on the vehicle body, engine body, etc., through a bracket having a predetermined stiffness, the bracket cannot but become larger and therefore there arises a disadvantage in that not only do the exhaust system supporting points increase in number but the weight at the supporting positions increases.

SUMMARY OF THE INVENTION

The present invention has been made in view of the circumstances mentioned above, and a main object of the invention is to provide an exhaust system supporting apparatus for an engine of a two-wheeled/three-wheeled vehicle having a simple configuration, in which an exhaust system connected to an exhaust port of an engine body is made to go around the outer periphery of an engine cooling fan to extend behind the vehicle body and wherein the exhaust system is fixed to supporting portions at the vehicle body, the engine body, etc. through a bracket, such that the exhaust muffler can be located near the engine while allowing the length of the exhaust system to be sufficiently long, to thereby eliminate the disadvantage mentioned above and enable the exhaust system to be effectively cooled by the cooling fan.

DETAILED DESCRIPTION OF THE PREFERRED EMBODIMENTS

Figure 1:
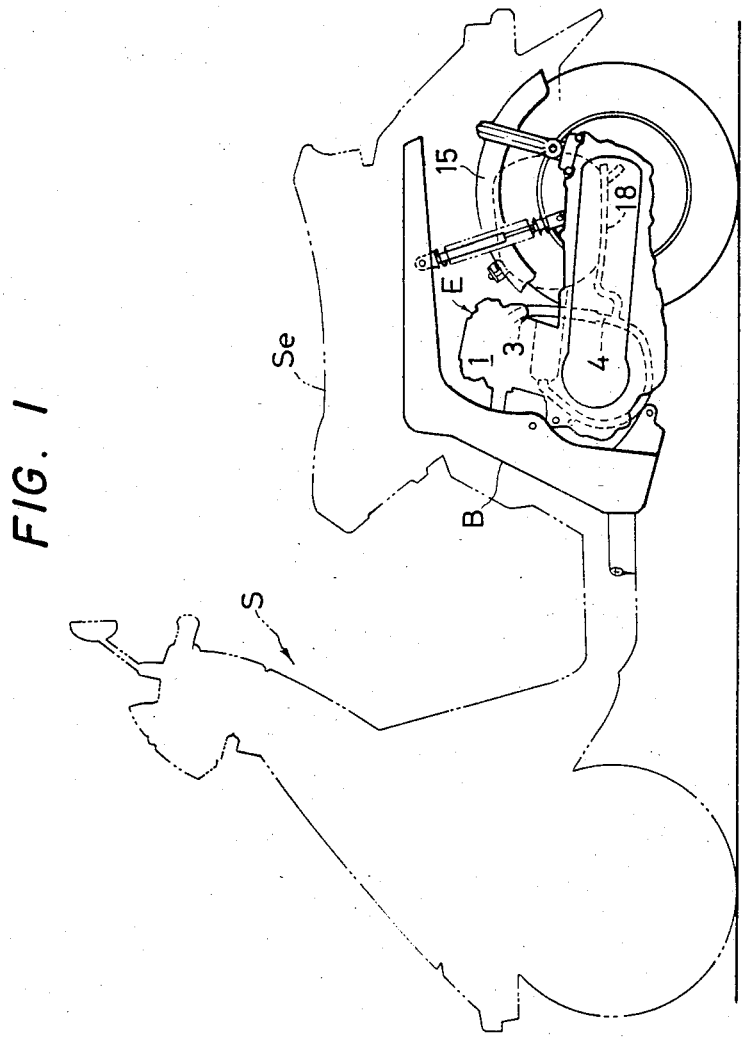
FIG. 1 is a side view of the whole of a scooter provided with the apparatus according to the present invention.
Figure 2:
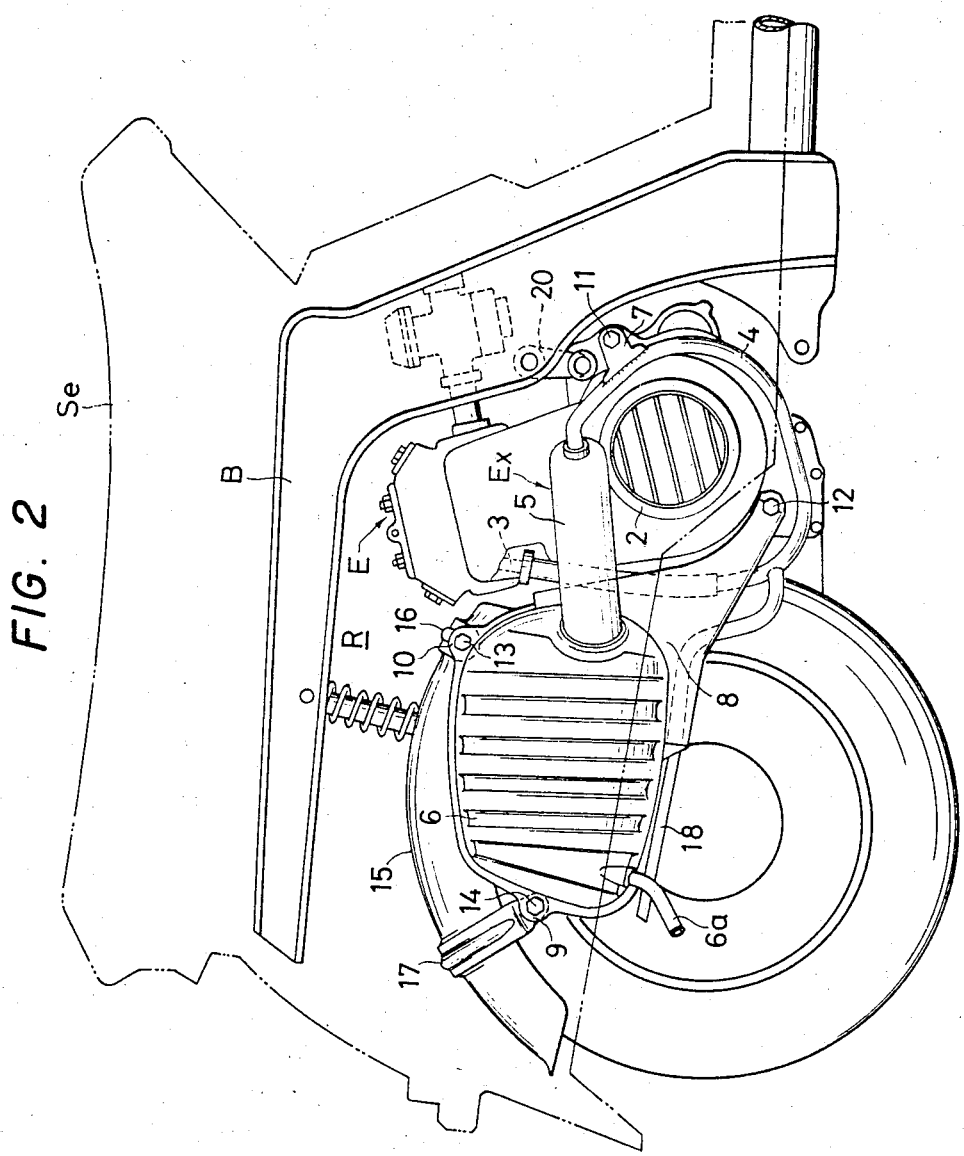
FIG. 2 is an enlarged side view of a part of FIG. 1.
Figure 3:
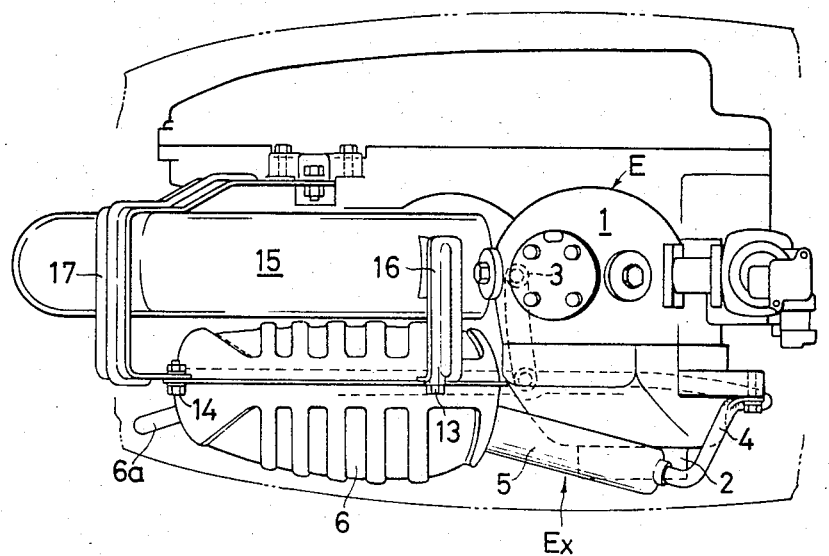
FIG. 3 is a plan view of the same.
Figure 4:
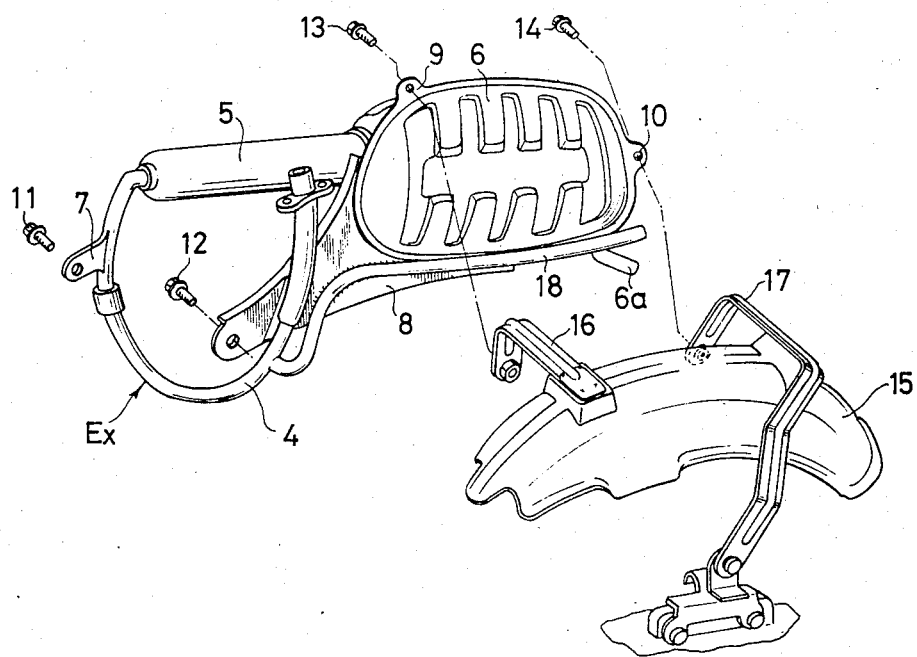
FIG. 4 is a perspective view of the apparatus of the invention.

Referring to the drawings, embodiments in which the present invention is realized in a motor scooter will be described hereunder. A four cycle engine E for running the motor scooter S is supported at the rear portion of a body B by a link 20 and/or suspension means and the like and accommodated in an engine room R under a seat Se.

On one side of an engine body 1 of the engine E, a cooling fan 2 driven by a crankshaft of the engine is provided for forcibly cooling the engine E in a known manner.

An exhaust pipe 4 is connected to an exhaust port 3 of the engine body 1. The exhaust pipe 4 curves around the cooling fan 2 toward the rear of the body B, and a resonator 5 is connected to the rear end of the pipe 4. The exhaust muffler 6 opens to the atmosphere through a tail pipe 6a provided at the rear end of the same.

The exhaust system Ex constituted by the exhaust pipe 4, the resonator 5 and the exhaust muffler 6 is fixedly attached to the body B and the engine body 1 by means of an attaching structure described hereinunder.

An attaching tongue member 7 is integrally fixed to the exhaust pipe 4, a triangular attaching bracket 8 is integrally provided on the exhaust muffler 6 and a pair of attaching protrusions 9 and 10 are formed at the flange-like periphery of the exhaust muffler 6. The attaching tongue member 7 is fixed to the side portion of the engine body 1 with a fixing bolt 11, the attaching bracket 8 is fixed with a fixing bolt 12 on the engine body 1 at the under portion thereof and the attaching protrusions 9 and 10 at the periphery of the exhaust muffler 6 are fixed with a rear fender 15.

A pipe-like pulsation chamber 18 is communicated with the exhaust pipe 4 at its root portion and is welded with the triangular attaching bracket 8 so as to increase the stiffness of the attaching bracket 8 per se. The pulsation chamber 18 serves to enhance the charging efficiency of the engine by utilizing the exhaust pulsation generated when the suction and exhaust valves of the four cycle engine overlap each other.

Exhaust gas generated by the running of the engine passes from the exhaust port to the exhaust muffler 6 through the exhaust pipe 4 and the resonator 5, meanwhile the pulsating gas being resonated, absorbed, interfered, expanded and/or cooled to be silenced, and the exhaust gas is then released to the atmosphere.

Figure 5:
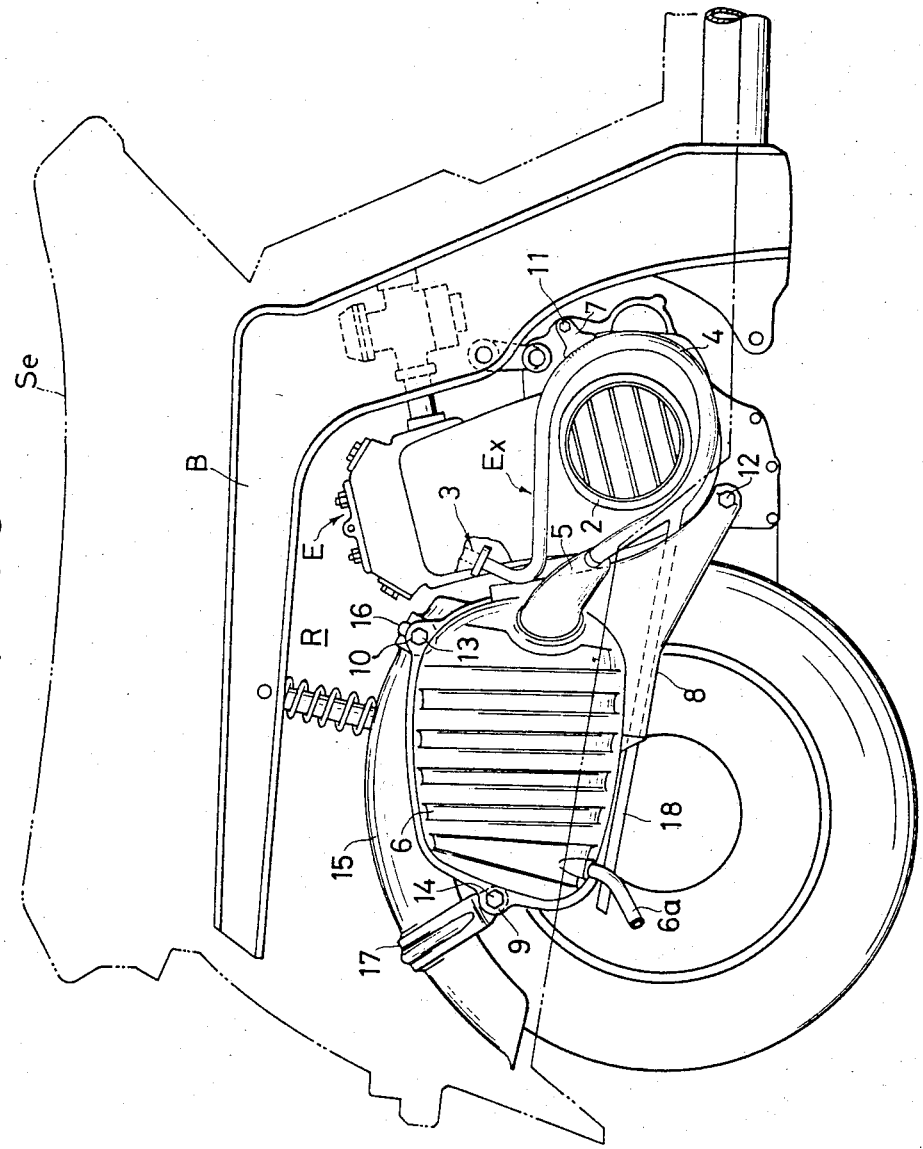
FIGS. 5 and 6 illustrate modifications of the embodiment shown in FIG. 1.
Figure 6:
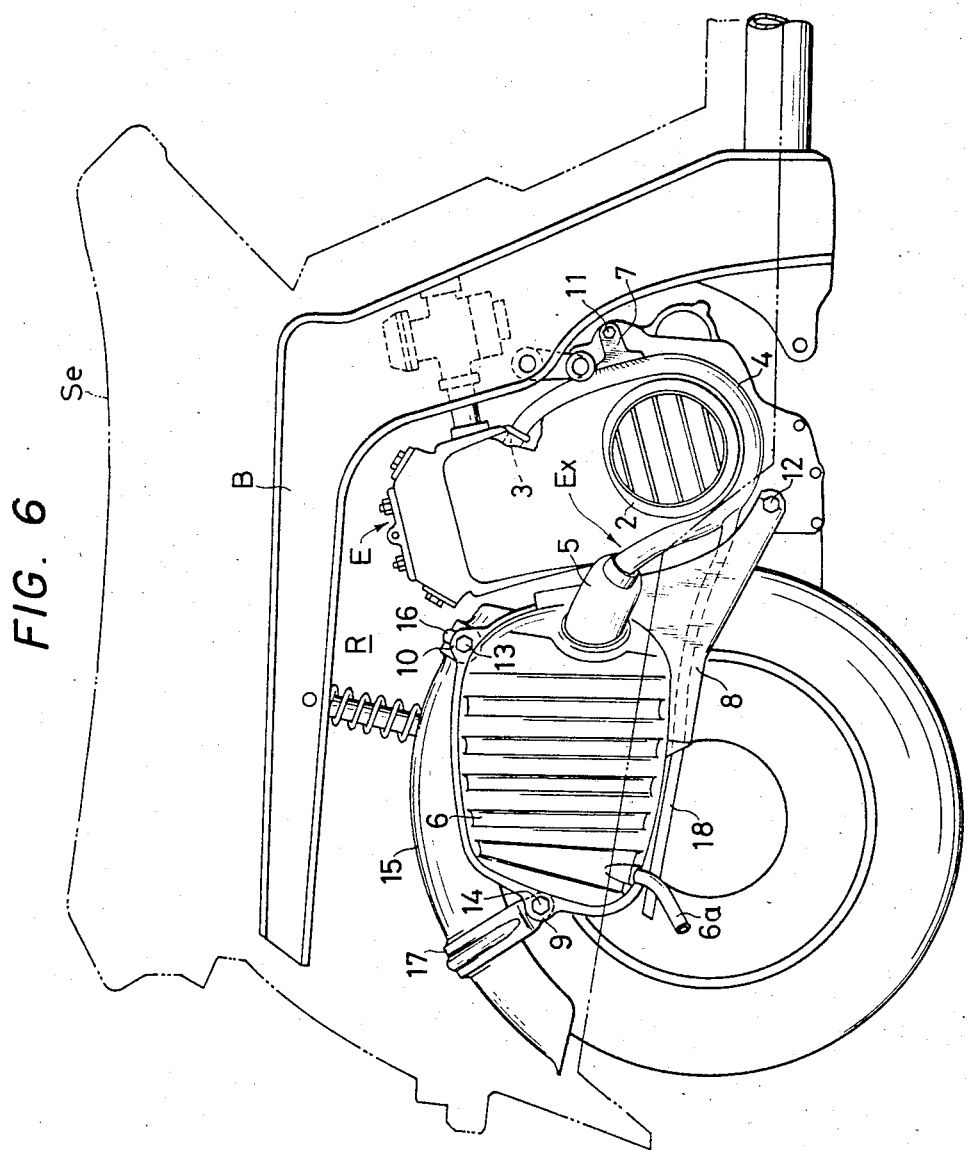

A second and third variation of the invention are shown in FIGS. 5 and 6, where like numerals designate like parts. FIG. 5 illustrates a case wherein the exhaust pipe 4 extending from the port 3 is curved about the cooling fan in the direction opposite that shown in FIG. 1, other parts and their descriptions remaining the same.

FIG. 6 illustrates the case wherein the exhaust port 3 is located forwardly of the engine body, as opposed to the placement in FIG. 1. In this case, the exhaust pipe is still easily curved about the cooling fan 2, over an arc thereof of around 180°, or more or less as desired.

In the description made above, an embodiment in which the invention was realized in a motor scooter was explained. The present invention can of course be applied to other two-wheeled and three-wheeled vehicles.

As aforementioned, according to the present invention, an exhaust system Ex connected to an exhaust port 3 of an engine body 1 is made to go around the outer periphery of an engine cooling fan 2 provided on one side of the engine body 1, to extend behind a vehicle body B, and the exhaust system is fixed to supporting portions at the body B, the engine body 1, etc., through an attaching bracket 8, so that the center of gravity of the exhaust muffler 6 which is located at a rear portion of the exhaust system Ex and which is relatively heavy can approach the center of gravity of the engine body 1 as nearly as possible while ensuring the desired length of the exhaust system Ex to thereby facilitate the support of the exhaust system. Thereby, the exhaust system Ex can be fixedly supported with desired stiffness to supporting portions of the body B, the engine body 1, etc. by means of a particularly small bracket 8, resulting in a reduction in weight of the supporting structure of the exhaust system Ex and a decrease in number of the supporting portions of the exhaust system Ex.

Further, the exhaust system Ex enclosing the cooling fan 2 can be effectively cooled by a cool air flow passing the periphery of the cooling fan 2.

Furthermore, the exhaust system can be accommodated in a confined engine room R in a compact manner, resulting in a facilitation of layout and/or attachment of other devices.

What is claimed is:

1. In a wheeled vehicle including an engine mounted to a frame of the vehicle, an engine exhaust port disposed at a rearward portion of the engine, and circular cooling means mounted to the engine forward of the exhaust port, an exhaust system comprising:
    a muffler mounted rearwardly of the engine; and
    an exhaust pipe having one end connected to the exhaust port and another, opposite end coupled to a muffler inlet,
    wherein the exhaust pipe is disposed proximate to the cooling means and is curved to extend around at least 240° of an outer periphery of the cooling means, such that air currents circulated by the cooling means cool the exhaust pipe efficiently.

2. An exhaust system as claimed in claim 1, wherein said exhaust apparatus includes at least said exhaust pipe and exhaust muffler means, said muffler means being mounted in close proximity to said engine.

3. An exhaust system as claimed in claim 2, said muffler being mounted at one point to said engine.

4. An exhaust system as claimed in claim 3, including a bracket integral with said exhaust pipe, wherein said muffler is connected integrally with said exhaust pipe, said bracket being attached to said engine at a forward end of said muffler.

5. An exhaust system as claimed in claim 2, said exhaust pipe being mounted to said engine, and said muffler being mounted to said engine and to a portion of said vehicle.

6. An exhaust system as claimed in claim 5, said muffler being mounted to a vehicle fender.

7. An exhaust system as claimed in claim 1, further comprising a resonator having one end connected to said opposite end of said exhaust pipe and another end connected to said muffler inlet, and wherein said exhaust pipe and resonator together substantially completely surround the cooling means.

* * * * *